United States Patent [19]

Trias

[11] Patent Number: 4,623,219

[45] Date of Patent: Nov. 18, 1986

[54] REAL-TIME HIGH-RESOLUTION 3-D LARGE-SCREEN DISPLAY USING LASER-ACTIVATED LIQUID CRYSTAL LIGHT VALVES

[75] Inventor: John A. Trias, La Mesa, Calif.

[73] Assignee: The United States of America as represented by the Secretary of the Navy, Washington, D.C.

[21] Appl. No.: 723,372

[22] Filed: Apr. 15, 1985

[51] Int. Cl.$^4$ .............................................. G02F 1/13
[52] U.S. Cl. .................................... 350/351; 350/132
[58] Field of Search ............... 350/351, 352, 117, 120, 350/121, 129, 132, 133–135, 137–139, 231, 241; 340/765, 784

[56] References Cited

U.S. PATENT DOCUMENTS 4,013,466  3/1977  Klaiber ................................ 350/351
4,561,727 12/1985  Hecks et al. ........................ 350/351

Primary Examiner—Arthur G. Evans
Attorney, Agent, or Firm—Robert F. Beers; Ervin F. Johnston; Thomas G. Keough

[57] ABSTRACT

A number of viewers wearing polarized glasses are presented real-time, high-resolution, three-dimensional projected images on a distant screen at video image signal rates. Two laser raster scanners each activate a separate one of two liquid crystal light valves with information representative of left or right eye images. A high intensity light source is polarized through a prism so that one component is directed to one liquid crystal light valve and an orthogonal component reaches the other liquid crystal light valve. Both components of the high intensity light are modulated by the valves and reflected back through the prism onto the distant screen. Laser diodes and solid-state vertical and horizontal deflection components in the laser raster scanners combined with the liquid crystal light valves and a single bi-polar prism result in a reliable, compact unit capable of providing long term economical displays. Three-dimensional viewing in real-time gives planners a more realistic apprisal of certain features such as terrain and obstacles so that responsive decisions may be reached and decisive action may be taken.

8 Claims, 4 Drawing Figures

REAL-TIME HIGH-RESOLUTION 3-D LARGE-SCREEN DISPLAY USING LASER-ACTIVATED LIQUID CRYSTAL LIGHT VALVES

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED APPLICATIONS

This application is related to a co-pending patent application in the United States Patent and Trademark Office, Ser. No. 446,292, now U.S. Pat. No. 4,533,215, entitled "Real-Time, Ultra-High Resolution Image Projection Display Using Laser-Addressed Liquid Crystal Light Valve" and another co-pending patent application in the United States Patent and Trademark Office, Ser. No. 643,216 entitled "Improved Real-Time Ultra-High Resolution Image Projection Display Using Laser-Addressed Liquid Crystal Light Valve".

BACKGROUND OF THE INVENTION

This invention relates to large screen displays for presenting images to a number of viewers. More particularly, this invention provides for a large screen display having the capability for operating in real-time at high resolution rates to provide a three-dimensional image of video information. In yet still greater particularity, this invention provides for a pair of laser raster scanners each aligned with a liquid crystal light valve and both orthogonally disposed with respect to one another to modulate a high intensity beam falling on a bi-polar prism to effect a three-dimensional representation at video rates for a number of viewers wearing polarized glasses.

The best known representation of the state-of-the-art which approaches the technology embraced in this concept is disclosed in the related applications identified above. In these applications real-time displays were a true reality and each used the liquid crystal light valve with improved scanning arrangements. The advantages of those applications were the low power of the laser writing beam and fine resolution enabled the high-rate, distortion-free reflection of a readily available high intensity light source onto a distant screen. The concepts embraced by the related applications have been proven under the demanding conditions imposed by military operations so that their evolution represents the true state-of-the-art.

Certain applications, however, make felt the need for a three-dimensional presentation of certain data so that planners are more precisely apprised of a situation. This is particularly true where quick decisions must be arrived at by military planners so that appropriate commands can be given. For example, a three-dimensional overview electronically provided by a remote piloted aircraft, puts the massed weaponry of the aggressor second echelon under telling surveillance and crippling fire hours before they are scheduled to reach the cluttered and blazing holocaust of the breakthrough point that the vanguard force has punched by dint of local numerical superiority and sheer sacrifice.

Thus there exists a continuing need in the state-of-the-art for a real-time, ultra high resolution image projection display that provides three-dimensional images simultaneously for a number of viewers.

SUMMARY OF THE INVENTION

The present invention is directed to providing an apparatus for displaying realtime, high-resolution, three-dimensional projected images on a distant screen at video image signal rates for a number of viewers wearing polarized glasses. A first and a second laser raster scanner each impart both vertical and horizontal scans of high bandwidth electronic signals of high data rate information via separate coherent beams modulated in accordance with left eye information or right eye information to write onto the photosensor surface of each respective LCLV. A first and second liquid crystal light valve each are modulated by one of the coherent beams to provide voltage patterns for components of linearly polarized light that are incident thereon. A high intensity light source projects through a polarizing bi-prism creating first and second components of linearly polarized light. The first component of the linearly polarized high intensity light is modulated in accordance with the voltage patterns created in the first liquid crystal light valve and the other, orthogonally disposed component of the linearly polarized high intensity light is modulated by the voltage patterns on the other liquid crystal light valve. These two modulated high intensity components are reflected back from the light valves and through the bi-prism and onto the distant screen to present real-time, high-resolution, three-dimensional projected images capable of being simultaneously observed by a number of viewers wearing polarized glasses.

A prime object of the invention is to provide a three-dimensional display on a distant wide screen for a number of viewers wearing polarized glasses.

Yet another object is to provide a three dimensional display at real-time high resolution video image signal rates.

Yet another object is to provide a pair of laser raster scanners each activating a liquid crystal light valve representing left or right eye images of high intensity light through a polarizing bi-prism and onto a distant screen for simultaneous viewing by a number of viewers.

Yet another object of the invention is to provide a three-dimensional, real-time, high-resolution display employing a pair of laser raster scanners and a pair of liquid crystal light valves with solid-state laser beam deflector components for increased reliability.

Yet another object is to provide a three-dimensional, real-time, high-resolution video image signal rate display with two laser raster scanners employing laser diode light source for writing onto the LCLVs and solid-state deflection constituents to assure compactness and high reliability.

These and other objects of the invention will become more readily apparent from the ensuing specification when taken in conjunction with the appended claims and the accompanying drawings.

DESCRIPTION OF THE PREFERRED EMBODIMENTS

Figure 1:
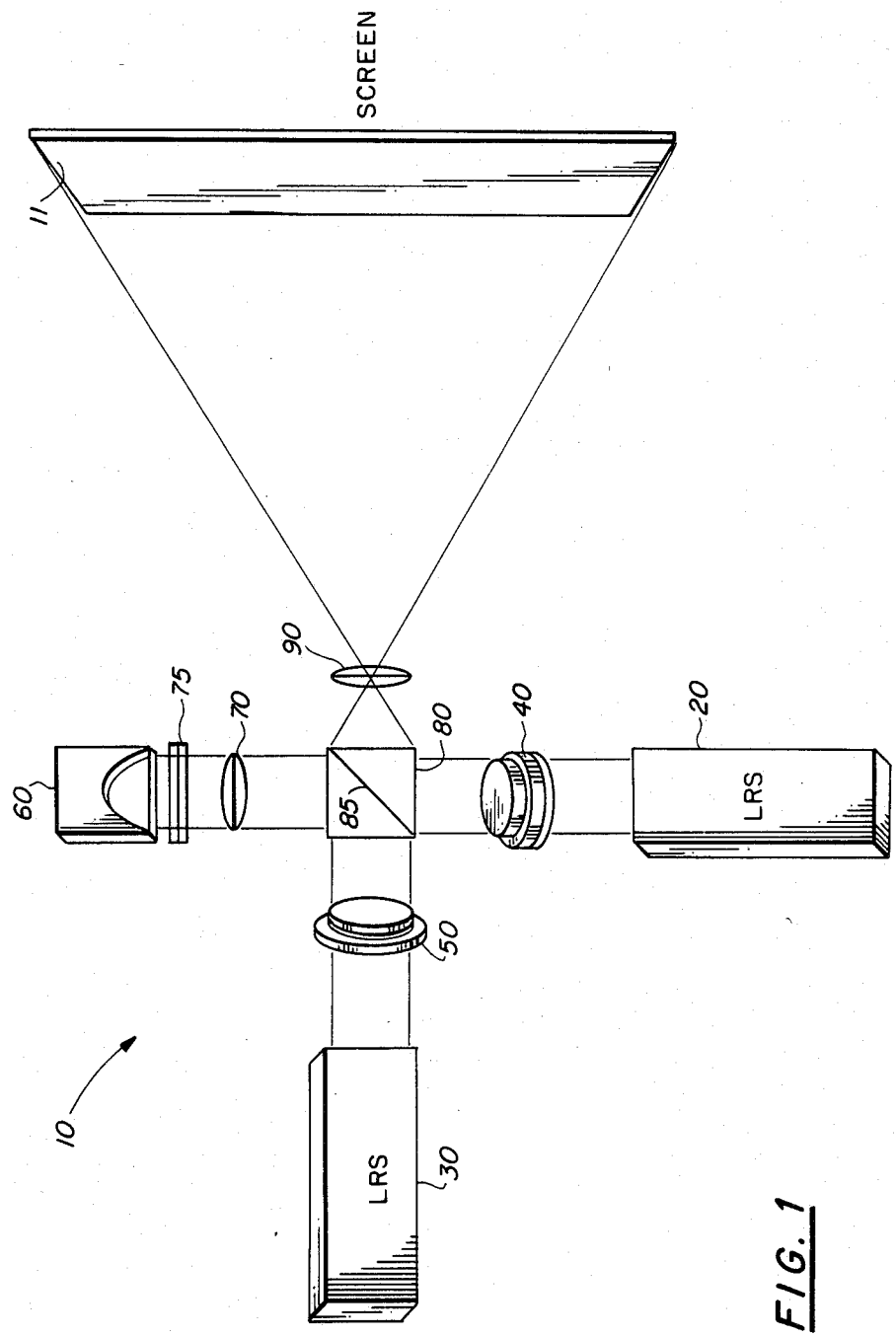
FIG. 1 is a block diagram representation of the principal constituents of the three-dimensional wide screen display of this invention.

Referring now to FIG. 1 of the drawings, a three-dimensional visual display system 10 is composed of high technology components arranged to display high-resolution, three-dimensional images in real-time at video rates on a remote display screen 11. Since this display relies on the superimposing of orthogonally polarized components of an image to assure the three-dimensional showing, the surface coating of the screen must be chosen carefully to minimize the rotation and spread of the polarization of the components. In this regard a high gain screen having a surface composition of metallic aluminum for higher picture brightness has proven to function satisfactorily as a representative coating material although it is envisioned that other suitable coatings may be substituted.

With the system of this invention the size of the display screen can vary from a TV screen sized area to an entire wall depending primarily on the projection optics selected and the needs of the viewing audience. The operative relationship of the specific elements disclosed in the preferred embodiment of this invention are selected to realistically provide the three-dimensional capability. Each of the viewing audience is wearing polarized glasses having one lens orthogonally polarized with respect to the other so that the three-dimensional images are visualized.

Two laser raster scanners 20 and 30 create scanned modulated coherent beams. Looking to FIG. 2, scanner 30 is shown with its constituents in block diagram form, it being understood that scanner 20 is substantially identical.

A laser diode 21 produces a coherent beam 22 having a diameter of about 50 microns at approximately 820 nanometers wavelength radiation. Typically, the laser diode is a model LDS 3-H or LDM 3-H manufactured by the Ortel Corp. of Alhambra, Calif. and is driven at about 30 milliwatts to generate a coherent beam of about 1.5 milliwatts with a 25 micron beam diameter. The laser diode functions in the $TEM_{00}$ mode as well as multi-mode to accommodate varying resolution requirements and has been found satisfactory to generate a coherent beam at the proper wave length and power. It is to be noted that the power demands of the laser diode are not excessive such that they would cause an undue power drain on a source. The coherent beam when properly modulated and deflected, as discussed in detail below, provides a writing beam for further elements also discussed later. Although any one of several wavelengths and spot sizes could be chosen, including infrared as well as other conventional lasers, the choice of a laser diode having the disclosed parameters was selected to allow a matching of its spectral response to other components.

Coherent beam 22 is emitted from the laser diode and passes through an optics package 23, an acousto-optic modulator 24, an interposed optics interface 25, a horizontal acousto-optic beam deflector 26, a vertical acousto-optic beam deflector 27, and interfacing optics 28 which direct a modulated and deflected coherent beam onto a liquid crystal light valve 40, or in the case of the laser raster scanner 30 to a liquid crystal light valve 50.

Each laser raster scanner includes an electronics module 29 that receives a video information signal. In this case the video information signals are designated as a left eye information signal in laser raster scanner 20 or right eye information in laser raster scanner 30. This video information as well as power from a power supply is received by each electronics module 29 to assure that modulation signals are outputted over a lead 24a and horizontal and vertical scan signals over leads 26a and 27a.

Figure 2:
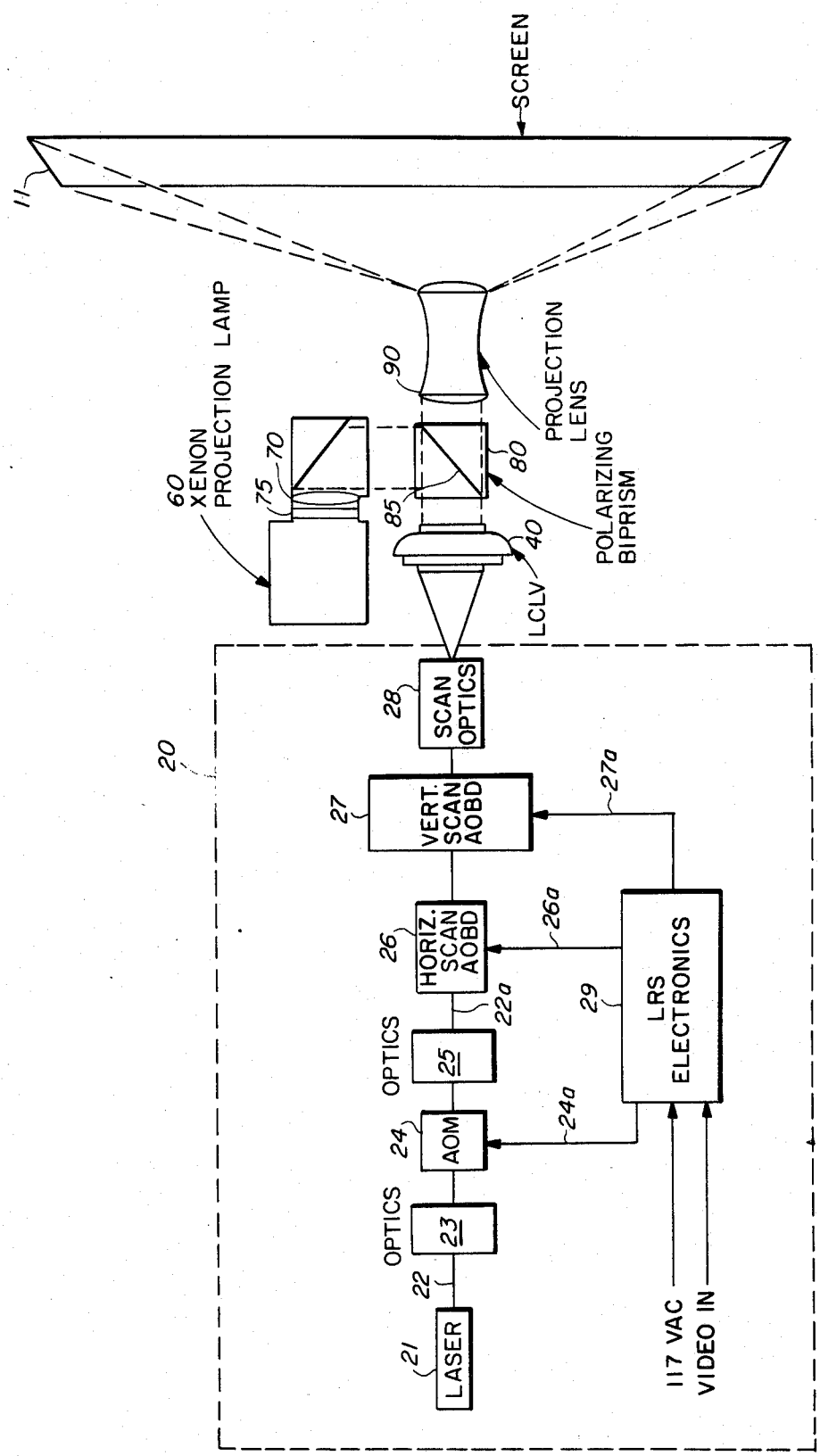
FIG. 2 shows details of the laser raster scanners operatively associated in conjunction with the principal elements of the invention for effecting the threedimensional display at real-time and high-resolution video image signal rates.
Figure 3:
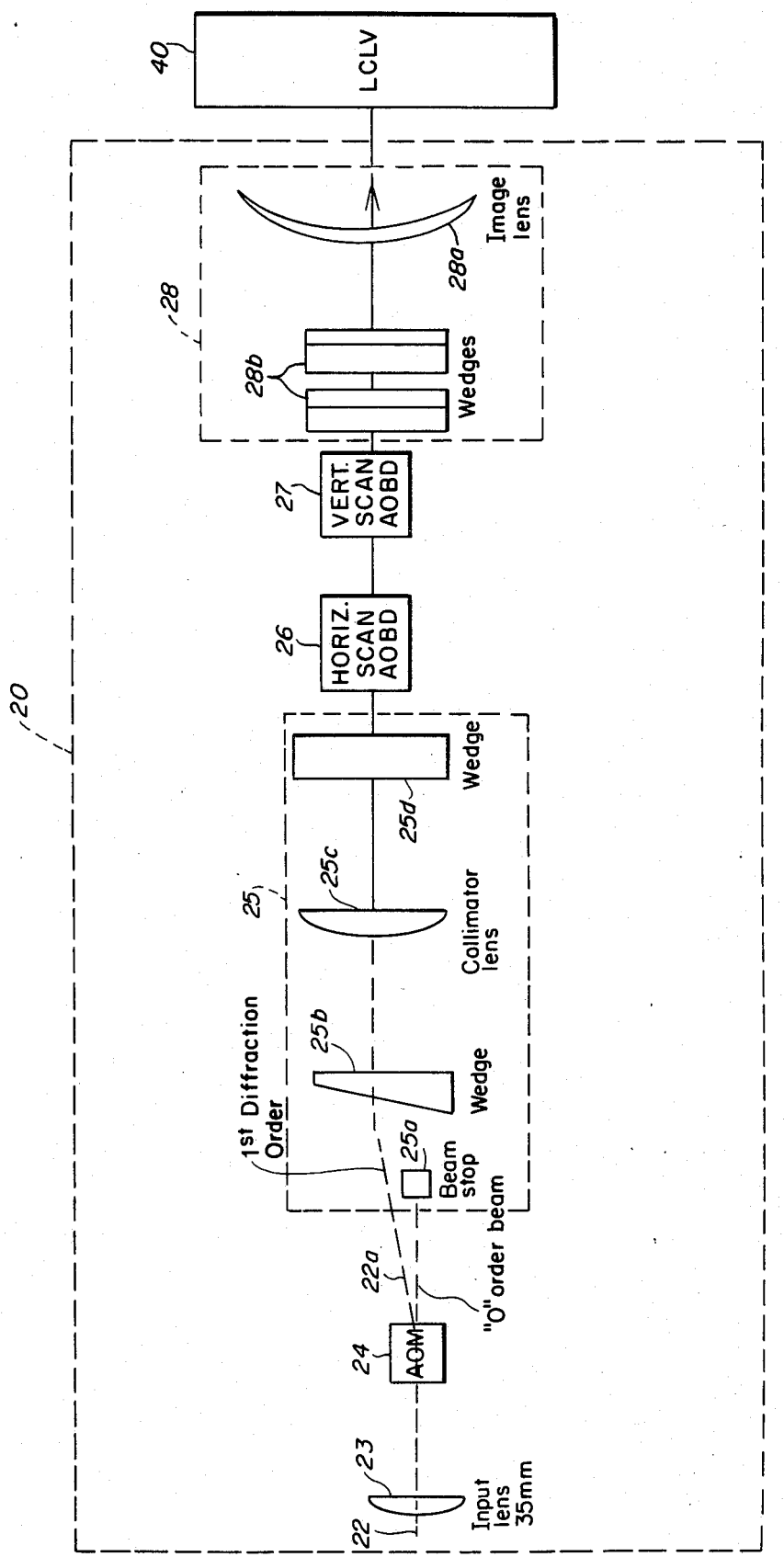
FIG. 3 shows a greater detail the constituents of the laser raster scanner.

Looking to FIG. 3 in conjunction with FIG. 2, each laser raster scanner is a completely self-contained unit and uses an acousto-optic modulator 24 for video modulating coherent beam 22 by a high speed RF driver capable of nanosecond rise times. The coherent beam passes through optics 23, which can be a 35 mm lens, that produce a 32 micron diameter spot size on a surface of a $TEO_2$ crystal within the acousto-optic modulator. This 32 micron spot size provides for a very fast rise time within the acousto-optic modulator and assures a possible 100 MHz video bandwidth.

The acousto-optic modulator is a commercially available Bragg cell formed of a $TEO_2$ crystal. This crystal has a 440 MHz carrier frequency modulator capability with a bandwidth of 100 MHz, a rise time of 5 nanoseconds and capability to modulate a coherent beam diameter of 32 microns with a center carrier frequency of 440 MHz. Although the precise dimensions of the Bragg cell can vary, a typical commercially available cell, a model N52525 is manufactured by Newport Electro-Optics Systems, Inc. of Melbourne, Fla. and has a length of 6.3 mm, a height of 0.2 mm and an acousto-optic Q of 31 with an external Bragg angle of 54 milliradians. Its diffraction efficiency is 0.5 milliwatts and a conversion loss of about 6 db with a diffraction efficiency of 0.5 watts (with the 6db conversion loss) equal to 73% measured.

The schematic representation of the laser raster scanner 20 in FIG. 3 shows in greater detail the optics along with the acousto-optic modulator and deflection components. The coherent beam 22 coming from light emitting diode 21 passes through the 35 mm input lens 23 to focus it as a 32 micron spot size on the acousto-optic modulator 24. The "0" diffraction order beam passing through the acousto-optic modulator is directed onto a beam stop 25a in optics 25. The beam spot need be no more than a suitably arranged black box. Modulated coherent beam 22a is the first diffraction order of the incident coherent beam and enters an optical wedge 25b within optics block 25. The wedge is a 3° wedge to maintain the modulated first diffraction order coherent beam parallel to the optical axis preestablished in the laser raster scanner. While the configuration of elements shown in FIG. 2 makes them appear to be spread over a considerable distance, the beam is translated only about 4 mm and is parallel to the DC optical axis. Beam stop 25a is included to prevent laser scattering from washing out to liquid crystal light valve 40 to create poor performance. This baffling is critical to obtain the high resolution performance and several other stops may be provided throughout the system where necessary.

After 3° wedge 25b, another scattered light block, not shown, that is similar to the block of beam stop 25a might be included. A collimator lens 25c receives the modulated first diffraction order of the coherent light to provide a magnification of 196/35=5.6(for a 196 mm collimator lens) to provide a light input for an acousto-optic beam deflector 26 of 7.2 mm in diameter. However, immediately before the acoustooptic beam deflector, another wedge 25d is provided that receives the 7.2 mm beam to provide the Bragg angle input to the slow shear $TEO_2$ photoelastic material of the acousto-optic beam deflector. This enables the amount for the acousto-optic beam deflector to have little adjustment and maintains high reliable performance.

The 7.2 mm acousto-optic beam deflector 26 input corresponds to an aperture of 11 microns which is mechanically apertured to 10 microns. The specification of both the acousto-optic beam deflectors are such that the material is slow shear $TEO_2$ having a bandwidth of 100 MHz with a center frequency of 150 MHz. The processing time equals 10 microseconds with an optical bandwidth of 6.2 mm with an optical beam height of 6.2 mm. The transducer height is 8 mm with a length of 0.1 mm with an acousto-optic Q of 23.6. The diffraction efficiency equals 15% measured at 2.5 watts. The specifications just names are the same for horizontal scan acousto-optic beam deflector 26 as well as the vertical scan acousto-optic beam deflector 27.

Horizontal scan acousto-optic beam deflector 26 and vertical scan acousto-optic beam deflector 27 are cross-axis acoustically and are as close together as possible to enable the transducer design to be the same for both cells. This keeps the optically spreading beam to a minimum width due to the acoustic lensing of the fast sweep horizontal acousto-optic beam deflector 26 and, the device behaving as a 415 mm lens, there is no need to have an optical lens for the horizontal axis. As a consequence, the only image lens is a cylindrical lens 28a within optics 28 to focus the vertical axis to provide for a one-to-one format of 35×35 mm size. The cylindrical lens 28a must have a 380 mm focal length. However, between the vertical scan acousto-optic beam deflector 27 and image lens 28a, two wedges 28b are provided to assure angle correction for the Bragg angle at the center frequency and to keep the modulated first diffraction order coherent beam on the optical axis with minimal translation.

In addition, this provides more aperture to prevent light scattering that might otherwise be detected by liquid crystal light valve 40 with the consequent distortion of the projected image on display screen 11. The image size projected out from the optics 28 is 35 mm by 35 mm with resolution elements of 525 and 525. Resolutions of greater than 1,000×1,000 and higher are envisioned by modifying the necessary electronics and optics. This increased capability allows a matching with the specifications of the liquid crystal light valves.

Figure 4:
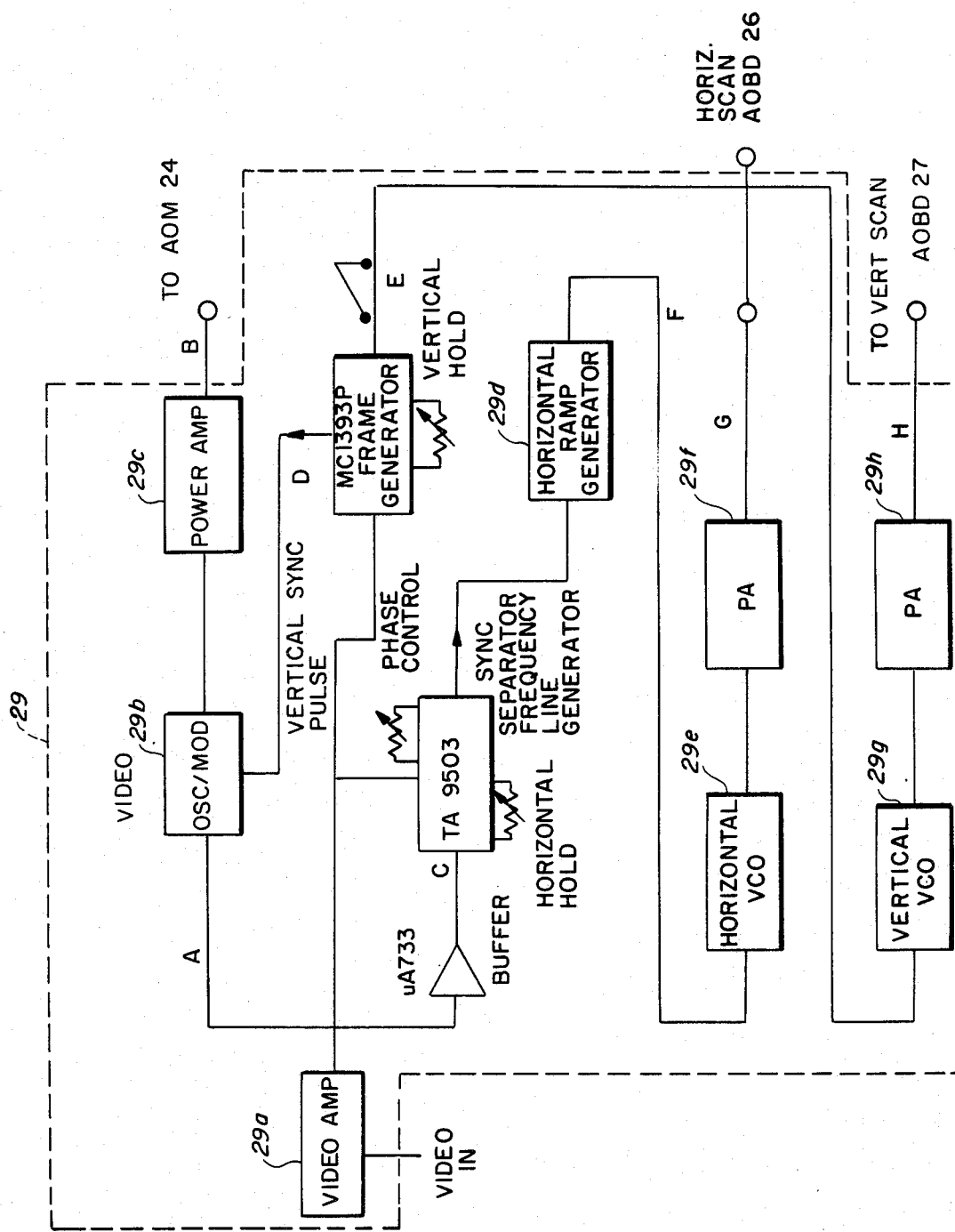
FIG. 4 is a block diagram of the components of the laser raster scanner electronics.

Laser raster scanner electronics 29, see FIG. 4, receives the video in at an amplifier 29a and feeds this signal to an oscillator modulator 29b and onto a power amplifier 29c. A 440 MHz crystal oscillator is included in the oscillator modulator and is responsive to the video input, the blanking signal to generate a 440 MHz amplitude modulated signal used to drive acousto-optic modulator 24. The acousto-optic coaction between the modulator and the driver circuitry consisting of the elements 29a, 29b and 29c varies the light intensity of the modulated first diffraction order coherent beam 22a so that it has its light intensity varied in accordance with the modulating video. The video level input to the acousto-optic modulator is within the limits prescribed for the particular unit used.

The video amplifier is equipped with gain and offset adjustments for receiving the input video signal and the adjustments having a range to adjust to levels to offset of any RS170 video input to the proper amplitudes and offsets required by the driver elements consisting of video amplifier 29a, oscillator modulator 29b and power amplifier 29c. The video amplifier has at least 18 to 25 MHz bandwidths.

The function of providing horizontal sweep for horizontal scan acousto-optic beam deflector 26 is provided for by an integrated circuit chip TA9503 suitably modified for sync operation and to provide a line rate oscillator. The horizontal OSC range is controlled by a horizontal hold appropriately adjusted by an appropriate control associated with the TA9503 chip. The output of the chip is a signal that controls horizontal sweep generator 29d and a vertical sync output pulse. The horizontal sweep generator uses the pulse out of the TA9503 to synchronize a horizontal ramp generator 29d. The ramp generator has a linearity of better than 1%. There are various offsets and gain adjustments for delay and the voltage scaling, the voltage ramp varies the frequency of a VCO 29e from 100 to 200 MHz linearly. This "chirp" is amplified by a N210300-4 power amplifier 29f to a two-watt signal that drives the horizontal scan acousto-optic beam deflector 26 which sweeps the modulated coherent beam horizontally.

Laser raster scanner electronics 29 further provides for the vertical sweep and for this purpose a MC1393P marketed by Motorola Corp. has proven satisfactory. The vertical sync pulse is received from the TA9503 chip and the frame generator is synced at 60 Hz and generates a sawtooth signal. The sawtooth level and amplitude are controlled to produce a suitable signal that varies the frequency of the vertical VCO 29g linearly from 100 to 200 MHz. This vertical "chirp" is amplified by amplifier 29h and is fed to the vertical scan acousto-optic beam deflector 27 to sweep the modulated coherent beam vertically.

There are four user controls which allow for controlling the picture roll in a horizontal direction otherwise referred to as horizontal hold, controlling the picture roll in a vertical direction referred to as vertical hold, and the combination of video gain. and offset to adjust the contrast and gray scale. The specifications listed above allow for a display image format of one-to-one and a size of 35 mm×35 mm with minimum resolutions per RS170 450 lines×400 lines. The scanned rate was 525/60 RS170EIA standard TV requirements. The number of gray levels was found to be greater than 7 and the optical throughput efficiency is greater than 0.1%.

Acousto-optic modulator 24 is adjusted in height location to optimize for the center of the active transducer electrode. Once this is maximized, the Bragg angle is maximized to achieve maximum diffraction efficiency. In this regard, the optical input is adjusted to horizontal acousto-optic beam deflector 26 to maximize for scan output as well as intensity uniformity. Vertical acousto-optical beam deflector 27 is then adjusted for maximum efficiency and intensity with uniformity over the scan of the beam coming from the horizontal scan beam deflector 26.

Suitably arranged beam stop blocks are adjusted to reduce the prevent light from scattering in the image plane to achieve high resolution and maximum gray levels on the face of the liquid crystal light valve 40. The two wedges 28b are adjusted to make the scan image parallel to the baseplate of the scanner. The image plane is then adjusted for the lensing power of the horizontal scanner. Lastly, the image is adjusted by cylindrical lens 28a to achieve the best focused image at the prescribed plane, that being the incident light plane on liquid crystal light valve 40. If the image size needs increasing, there is no difficulty in using relay lenses to achieve proper magnifications in the optical train.

The liquid crystal light valve selected for either liquid crystal light valve 40 or liquid crystal light valve 50 can be one of several. Hughes commercially markets a model 10555 liquid crystal light valve that has functioned in a highly satisfactory manner. It has a photosensor with a 50 mm diameter with a sensitivity of 100 microwatts per square centimeter at 514.5 nanometers. When the modulated coherent beam strikes the 50 mm diameter surface, it passes through a transparent conductive electrode and impinges on a photosensor layer, a cadmium sulphide layer, that is responsive to light at this wavelength. An option would be to provide a silicon photosensor layer in the light valve that would be sensitive to near infrared radiation. This would give a faster response time.

The photosensor detects the modulated coherent beam and impresses a voltage pattern on the nematic liquid crystal. The voltage pattern of the image on the liquid crystal electrooptically alters the optical properties of the crystal by the phenomenon known as bi-refrigence. This valve acts like a controlled bi-refrigence mirror and is used to rotate and, hence, selectively modulate linearly polarized light for image generation.

Referring back to FIG. 1, unpolarized projected light comes from a high intensity Xenon projection lamp 60 that radiates high intensity light through a lens 70 that collimates it. Interposed between the lamp and lens, a combination U-V and IR filter 75 blocks harmful U-V and headlight radiation away from the liquid crystal light valve. The collimated incoherent high intensity light is directed onto a polarizing bi-prism 80.

The polarizing bi-prism is also known as a McNeille bi-prism that linearly polarizes an incoherent light beam such as that coming from the high intensity light source 60 and through the collimating lens 70. Any one of a number of commercially available polarizing bi-prisms can be selected.

The bi-prism hypotenuse 85 reflects a first component of linearly polarized light to the surface of liquid crystal light valve 50. It passes a second component of the linearly polarized light that is orthogonal to the first component onto the surface of light crystal light valve 40. Liquid crystal light valve 50 is being modulated by the modulated first diffraction order coherent beam with information representative of left eye information and liquid crystal light valve 40 is being modulated by its first diffraction order coherent beam that was modulated in accordance with right eye information. Therefore, left eye images from the liquid crystal light valve 50, and right eye images from the liquid crystal light valve 40 are reflected back into the polarizing bi-prism. The reflected left eye information from liquid crystal light valve 50 passes through the hypotenuse 85 of the polarizing bi-prism through projection lens 90 and onto screen 11. The right eye information reflected from liquid crystal light valve 40 is reflected from the bi-prism hypotenuse into a suitably disposed projection lens 90 and onto screen 11.

The left eye information from laser raster scanner 30 and liquid crystal light valve 50 and the right eye information from laser raster scanner 20 and liquid crystal light valve 40 are superimposed on screen 11 at real-time to provide the threedimensional viewing capability for viewers observing the superimposed images with polarized glasses.

Obviously, many modifications and variations of the present invention are possible in the light of the above teachings. It is therefore to be understood that within the scope of the appended claims the invention may be practiced otherwise than as specifically described.

I claim:

1. An apparatus for displaying real-time, high-resolution three-dimensional projected images on a distant screen at video image signal rates comprising:
   a first and a second laser raster scanner means each for reciprocably imparting both vertical and horizontal scans of a separate coherent beam modulated in accordance with left eye information or right eye information respectively;
   a first and a second means, one aligned to receive the left eye information modulated scanned coherent beam and the other aligned to receive the right eye information modulated coherent beam each for selectively changing the polarization orientation of linearly polarized light incident thereon in response to a voltage pattern directly produced therein by the left eye information modulated scanned coherent beam or the right eye information modulated scanned coherent beam respectively;
   means disposed for projecting a high intensity light beam onto the first and second polarization changing means; and
   means disposed to intercept the high intensity light beam from the projecting means for reflecting a first linearly polarized component of high intensity light onto the first light polarization orientation changing means and for directing modulated reflected high intensity light modulated in accordance with the left eye information modulated scanned coherent beam onto the distant screen, and, for directing a second linearly polarized component of high intensity light that is orthogonal to the first component onto the second light polarization orientation changing means and for reflecting modulated reflected high intensity light modulated in accordance with the right eye information modulated scanned coherent beam onto the distant screen, the left eye information modulated high intensity light and the right eye information modulated high intensity light on the distant screen forming real-time, high resolution three-dimensional images at video image rates when observed with left and right eye polarized glasses.

2. An apparatus according to claim 1 in which the reflecting and directing means is a bipolar prism and the first laser raster scanner means and first light polarization orientation changing means are aligned and orientated to modulate and reflect the first linearly polarized component of high intensity light and the second laser raster scanner means and the second light polarization orientation changing means is orthogonally disposed with respect to the first scanner means and changing means and aligned and orientated to modulate and reflect the second linearly polarized component of high intensity light.

3. An apparatus according to claim 2 in which the first and second light polarization orientation changing means are each a liquid crystal light valve and the left eye information modulated coherent beam and the right eye information modulated coherent beam are each a writing beam that scans a photosensitive layer of a respective liquid crystal light valve and the reflected first linearly polarized component of high intensity light and the reflected second linearly polarized component of high intensity light each are reflected through a liquid crystal layer in each liquid crystal light valve that effects a modulation of the first component or second component of the linearly polarized high intensity light respectively.

4. An apparatus according to claim 3 in which the first and second laser raster scanner means are each a first and a second laser, each providing a beam of coherent light, a first and a second modulating means each disposed to receive a separate beam of coherent light for modulating it in accordance with left eye or right eye information, respectively and a first and a second scanning means each disposed to receive a left eye information modulated coherent beam or a right eye information modulated coherent beam respectively for imparting vertical and horizontal scanning of the coherent beams.

5. An apparatus according to claim 4 in which the first and second laser are each a laser diode.

6. An apparatus according to claim 5 in which the first and second modulating means is each an acousto-optic diffraction modulator modulating the light intensity of the first order of the coherent beam with either left eye or right eye information signals respectively.

7. An apparatus according to claim 6 in which the first and second scanning means each have two acousto-optic diffraction deflectors effecting the vertical and horizontal scanning of the coherent beam.

8. An apparatus according to claim 7 further including a combination U-V and IR filter disposed to receive the high intensity light from the high intensity light beam projecting means to avoid material degradation of the liquid crystal light valve.

* * * * *